United States Patent
Parmar et al.

(10) Patent No.: US 12,541,711 B2
(45) Date of Patent: Feb. 3, 2026

(54) METHOD OF TRAINING A MODULE AND METHOD OF PREVENTING CAPTURE OF AN AI MODULE

(71) Applicants: Robert Bosch GmbH, Stuttgart (DE); Robert Bosch Engineering and Business Solutions Private Limited, Bangalore (IN)

(72) Inventors: Manojkumar Somabhai Parmar, Ahmedabad (IN); Mayurbhai Thesia Yash, Ahmedabad (IN)

(73) Assignees: Robert Bosch GmbH, Stuttgart (DE); Robert Bosch Engineering and Business Solutions, Priya Bangalore (IN)

( * ) Notice: Subject to any disclaimer, the term of this patent is extended or adjusted under 35 U.S.C. 154(b) by 698 days.

(21) Appl. No.: 17/758,596

(22) PCT Filed: Dec. 21, 2020

(86) PCT No.: PCT/EP2020/087477
§ 371 (c)(1),
(2) Date: Jul. 11, 2022

(87) PCT Pub. No.: WO2021/144125
PCT Pub. Date: Jul. 22, 2021

(65) Prior Publication Data
US 2023/0050484 A1 Feb. 16, 2023

(30) Foreign Application Priority Data
Jan. 17, 2020 (IN) .............................. 202041002115

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

| 2014/0244293 A1 | 8/2014 | Jones, III |
| 2017/0085774 A1 | 3/2017 | Majumdar et al. |

(Continued)

FOREIGN PATENT DOCUMENTS

| WO | 2015/142940 A1 | 9/2015 |

OTHER PUBLICATIONS

International Search Report corresponding to PCT Application No. PCT/EP2020/087477, mailed May 18, 2021 (English language document) (6 pages).

(Continued)

*Primary Examiner* — Jonathan A Bui
(74) *Attorney, Agent, or Firm* — Maginot, Moore & Beck LLP

(57) ABSTRACT

A method of training a module in an AI system and a method of preventing capture of an AI module in the AI system is disclosed. The AI system includes at least an AI module executing a model, a dataset, and the module adapted to be trained. The method includes receiving input data in the module adapted to be trained, labelling data as good data and bad data in the module adapted to be trained, classifying binarily the labelled good data and the labelled bad data in the module adapted to be trained, inputting the binarily classified data into the AI module, and recording internal behavior of the AI module in response to the binarily classified data on the module adapted to be trained.

9 Claims, 2 Drawing Sheets

(56) References Cited

U.S. PATENT DOCUMENTS

2019/0095629 A1    3/2019  Lee et al.
2019/0347418 A1*  11/2019  Strogov .................. G06F 21/44
2020/0202171 A1*  6/2020  Hughes .................... G06F 8/36
2021/0029161 A1*  1/2021  Irimie .................... G06N 3/006

OTHER PUBLICATIONS

Batista, et al., "A Study of the Behavior of Several Methods for Balancing Machine Learning Training Data", Sigkdd Explorations, vol. 6, Issue 1, Jun. 2004 (10 pages).
Yu, et al., "A Method for Automatic Identification of Reliable Heart Rates Calculated from ECG and PPG Waveforms", Journal of the American Medical Informatics Association, vol. 13, No. 3, May/Jun. 2006 (12 pages).

* cited by examiner

METHOD OF TRAINING A MODULE AND METHOD OF PREVENTING CAPTURE OF AN AI MODULE

This application is a 35 U.S.C. § 371 National Stage Application of PCT/EP2020/087477, filed on Dec. 21, 2020, which claims the benefit of priority to Serial No. IN 202041002115, filed on Jan. 17, 2020 in India, the disclosures of which are incorporated herein by reference in their entirety.

The following specification describes and ascertains the nature of this invention and the manner in which it is to be performed.

The present disclosure relates to a method of training a module in an AI system and a method of preventing capture of an AI module in the AI system.

BACKGROUND

Now days, most of the data processing and decision making systems are implemented using artificial intelligence modules. The artificial intelligence modules use different techniques like machine learning, neural networks, deep learning etc.

Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs, the AI systems use various models/algorithms which are trained using the training data. Once the AI system is trained using the training data, the AI systems use the models to analyze the real time data and generate appropriate result. The models may be fine-tuned in real-time based on the results.

The models in the AI systems form the core of the system. Lots of effort, resources (tangible and intangible), and knowledge goes into developing these models.

It is possible that some adversary may try to capture/copy/extract the model from AI systems. The adversary may use different techniques to capture the model from the AI systems. One of the simple techniques used by the adversaries is where the adversary sends different queries to the AI system iteratively, using its own test data. The test data may be designed in a way to extract internal information about the working of the models in the AI system. The adversary uses the generated results to train its own models. By doing these steps iteratively, it is possible to capture the internals of the model and a parallel model can be built using similar logic. This will cause hardships to the original developer of the AI systems. The hardships may be in the form of business disadvantages, loss of confidential information, loss of lead time spent in development, loss of intellectual properties, loss of future revenues etc.

There are methods known in the prior arts to identify such attacks by the adversaries and to protect the models used in the AI system. The prior art US 2019/0095629 A1 discloses one such method.

The method disclosed in above prior art receives the inputs, the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

SUMMARY

According to an exemplary embodiment of the disclosure, a method is for training a module adapted to be trained in an AI system. The AI system includes at least an AI module executing a model, a dataset, and the module adapted to be trained. The method includes receiving input data in the module adapted to be trained, labelling data as good data and bad data in the module adapted to be trained, and classifying binarily the labelled good data and the labelled bad data in the module adapted to be trained. The method also includes inputting the binarily classified data into the AI module, and recording internal behavior of the AI module in response to the binarily classified data in the module adapted to be trained.

BRIEF DESCRIPTION OF THE DRAWINGS

Different modes of the invention are disclosed in detail in the description and illustrated in the accompanying drawing.

DETAILED DESCRIPTION

Figure 1:
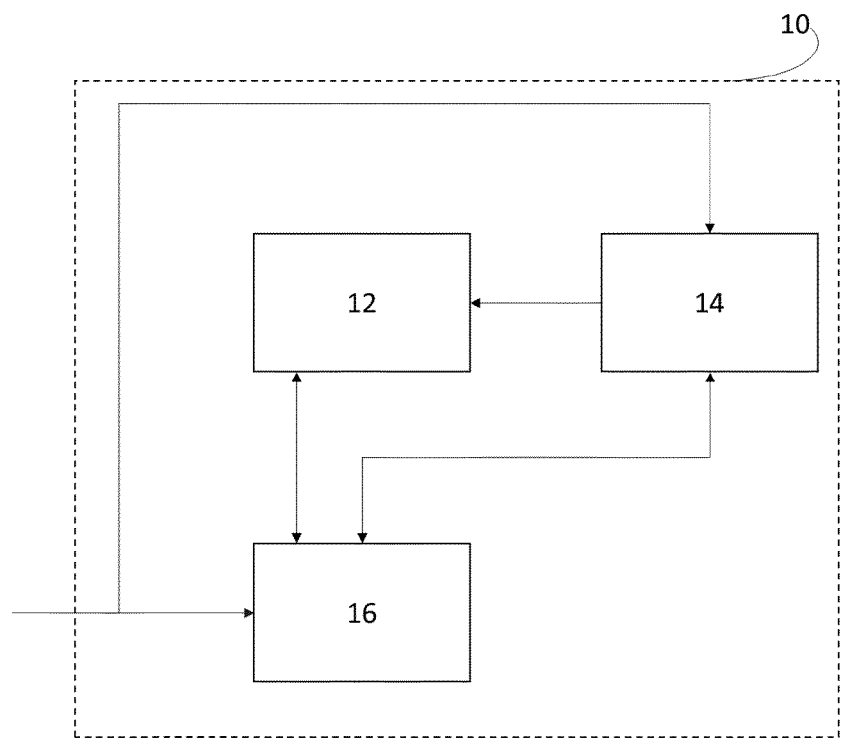
FIG. 1 illustrates a block diagram representative of the different building blocks of an AI system used for creating a trained module based on supervised learning.

It is important to understand some aspects of artificial intelligence (AI) technology and artificial intelligence (AI) based systems or artificial intelligence (AI) system. This disclosure covers two aspects of AI systems. The first aspect is related to the training of a module in the AI system and second aspect is related to the prevention of capturing of the AI module in an AI system.

Some important aspects of the AI technology and AI systems can be explained as follows. Depending on the architecture of the implements AI system may include may components. One such component is an AI module. An AI module with reference to this disclosure can be explained as a component which runs an model. A model can be defined as reference or an inference set of data, which is use different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. It must be understood that this disclosure is not specific to the type of AI model being executed in the AI module and can be applied to any AI module irrespective of the AI model being executed. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As mentioned one aspect of this disclosure relates to the training of the module in the AI system. The training is a supervised learning methodology. The specific details of the supervised training methodology will be explained in the later part of this document.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined a path or means by which a hacker can gain access to a computer or a network in order to deliver a payload or a malicious outcome. A model stealing attack uses a kind of attack vector that can make a digital twin/replica/copy of an AI module. This attack has been demonstrated in different research papers, where the model was captured/copied/extracted to build a substitute model with similar performance.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from scratch using this secondary dataset. This is black box model attack vector where no prior knowledge of original model is required. As the prior information regarding model is available and increasing, attacker moves towards more intelligent attacks. The attacker chooses relevant dataset at his disposal to extract model more efficiently. This is domain intelligence model based attack vector. With these approaches, it is possible to demonstrate model stealing attack across different models and datasets.

As mentioned earlier the second aspect of this disclosure relates to the prevention of capturing of the AI module in an AI system by detecting the attack. This is correlated to the first aspect of this disclosure as the AI module uses a trained model which uses a supervised learning methodology to detect the attack and other component of the AI system are used to prevent the attack. The specific details of the supervised training methodology will be explained in the later part of this document.

It must be understood that the disclosure in particular discloses methodology used for training an module in an AI system and a methodology to prevent capturing of an AI module in an AI system. While these methodologies describes only a series of steps to accomplish the objectives, these methodologies are implemented in AI system, which may be a combination of hardware, software and a combination thereof.

Figure 2:
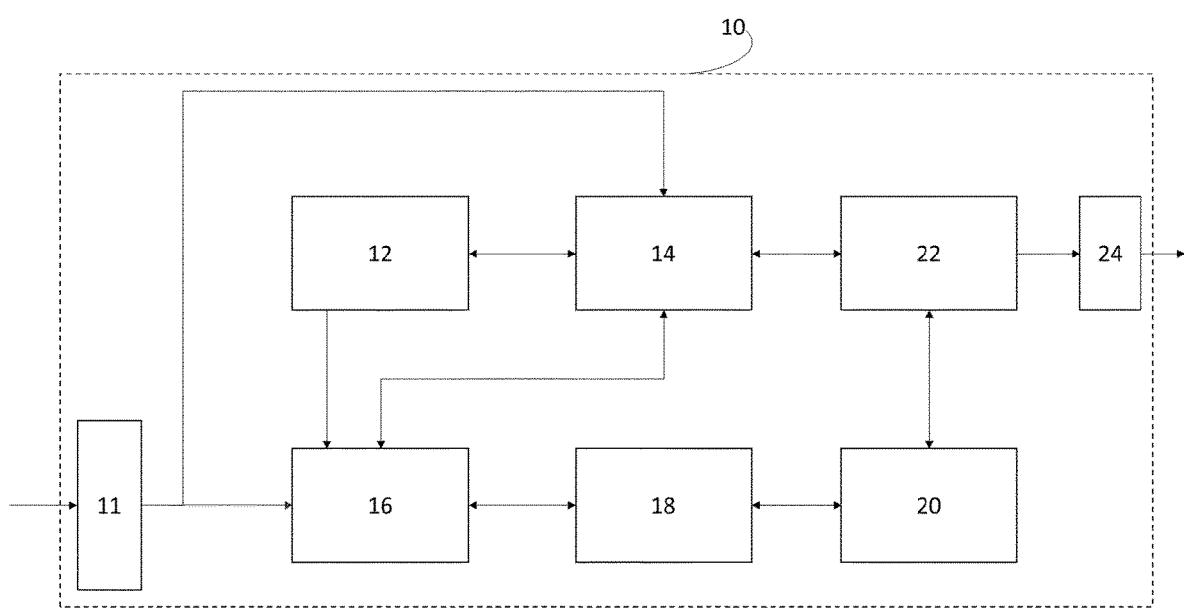
FIG. 2 illustrates a block diagram representative of the different building blocks of an AI system used for preventing capture of an AI module in an AI system.

FIG. 1 and FIG. 2 illustrate a block diagrams representative of the different building blocks of an AI system in accordance with this disclosure. It must be understood that each of the building blocks of the AI system may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud.

FIG. 1 illustrates a block diagram representative of the different building blocks of an AI system used for creating a trained module based on supervised learning. These building blocks are a dataset 12, an AI module 14 and a module 16. The supervised training methodology can be explained as follows. A method of training a module 16 in an AI system 10, the AI system 10 comprises at least an AI module 14 executing a model, a dataset 12 and the module 16 adapted to be trained. The method comprises the following steps: receiving input data in the module 16, labelling data as good data and bad data in the module 16, classifying binarily the labelled good data and the labelled bad data in the module 16, inputting the binarily classified data into the AI module 14 and recording internal behavior of the AI module 14 in response to the binarily classified data on the module 16.

The module 16 receives input data. The input data is received through an input interface, in the training scenario the input interface is a hardware interface that is connected to the module 16 via a wired connection or a wireless connection. In one embodiment the module 16, the dataset 12 and the AI module are implemented as hardware components. The module 16 would comprise a processor component, which also has a storage medium. The dataset is a storage medium. The AI module 16 comprises a processor component, which also has a storage medium. As seen in FIG. 1, the input data is received by the module 16 and the AI module 14. The AI module communicates with the dataset 12 and the module 16. The dataset 14 communicates with the module 16. The input data provided to the module 16 may be a combination of input, which triggers an expected output from the AI module 14 and input, which triggers an unexpected output from the AI module 14. Based on historical information the input which triggers an expected output is labelled as good data. Based on historical information the input which triggers an unexpected output is labelled as bad data. Once the labelling of good data and bad data is done, a binary classification methodology is used in the processor of the module 16 to train and indicate number of instances of good data and bad data. Bad data in technical terminology is also known as attack vectors.

Attack vectors are random queries, which are received by the module 16 and the AI module. Since attack vectors or bad data is random and the number of attack vectors cannot be controlled, in principle while training the module 16 and in real time attack vector will be much higher in number than the good data. Thus during binary classification the attack vector or bad data will be represented in much higher density in comparison to the good data. If this higher density of bad data is used as is then the model within the AI module 16 considers that the default state of any input data is bad data or attack vector. This is known as class imbalance of the bad data with reference to the good data. To avoid this class imbalance during binary classification of the labelled bad data, the labelled bad data is sampled in a manner such that the labelled bad data is represented in a balanced manner with respect to the labelled good data. The balanced and binarily classified data is then given as input to the AI module 14. When the AI module 14 receives the balanced and binarily classified data, the AI module 14 may behave in an expected manner or in an unexpected manner. The output behavior of the AI module 14 is sent to module 16 and recorded in the module 16. Post recording of the internal behavior of the AI module 14, the module 16 is a trained module 16. The trained module 16 is trained using the supervised learning methodology as mentioned in the earlier text. The information from the trained module 16 is also stored in the dataset 24 for further use.

FIG. 2 illustrates a block diagram representative of the different building blocks of an AI system used for preventing capture of an AI module in an AI system. These building blocks are an input interface 11, a dataset 12, an AI module 14, a module 16 (trained module 16), information gain module 18 (IG module), blocker 20, blocker notifier 22 and an output interface 24. As mentioned earlier based on the architectural framework of the AI system depends on the implementing application. The building blocks of the AI system 10 may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud. Each building block of the AI system in one embodiment would have a individual processor and a memory.

The method to prevent capturing of an AI module 14 in an AI system (10) comprises the following steps: receiving an input from at least one user through an input interface 11, processing the received input in the AI module 14 and the module (16), the module 16 is a trained module 16. Flagging the received input based on a trained module 16 (attack vector) in the AI system 10, the flagging executed in the trained module 16; flagging the at least one user from whom the input was received, the flagging executed in the trained module 16; computing information gain extracted by the at least one user based on processing done in the AI module (14), the computing executed in an information gain (IG) module 18 and locking out the at least one user based on the computed information gain, the locking out executed using a blocker 20 and a blocker notifier 22. The information gain is computed using information gain methodology. The method comprises the step of locking out the user if the information gain extracted exceeds a pre-defined threshold. The method comprises the step of locking out the system based on computed information gain extracted by plurality of users. The locking out the system is initiated if the cumulative information gain extracted by plurality of users exceeds a pre-defined threshold.

During runtime and during the working of the AI system 10 in accordance with this disclosure, the AI system may receive an input through the input interface 11. The input is received by the AI module 14 and the trained module 16. Irrespective of whether input is good data or bad data (attack vector), the AI module gives a certain output. In the trained module 16 the input received and the user from the whom the input is received is flagged. The information gain for the flagged input is computed in the IG module 18. During computation of the information gain if the information gain exceeds a certain pre-defined threshold then the user is blocked from using and accessing the AI module 10. During the processing of the input data in the trained module 16, if the flagged input data or flagged user is identified by the trained module 16, then this information is passed onto the blocker 20 through the information gain module. The blocker then blocks this flagged data or flagged user.

In certain cases it is also possible, that there may be plurality of user sending bad data or attack vectors. In this case, the information gain extracted by one single user would not be alarming to block the user. In this case, the cumulative information gain is computed by the IG module 18 and the blocker 20 blocks out the entire AI system. If the information gain extracted during a single instance of inputting bad data or attack vector is less than pre-defined threshold then the AI module 14 will provide some output through the output interface 24. Similarly, if the input data is a good data, then the AI module 14 will provide the expected output through the output interface 24.

As mentioned earlier the trained module 16 is adapted to flag user. Flagging of the user would be based on the user profile. The following information may be used to store information regarding the user: types of the bad data/attack vectors provided by the user, number of times the user input bad data/attack vector, the time of the day when bad data/attack vector was inputted to the AI system, the physical location of the user, the digital location of user, the demographic information of the user and the like. In addition the user profile may be used to determine whether the user is habitual attacker or was it one time attack or was it only incidental attack etc. Depending upon the user profile, the steps for unlocking of the system may be determined. If it was first time attacker, the user may be locked out temporarily. If the attacker is habitual attacker then a stricter locking steps may be suggested.

As mentioned earlier based on the cumulative information gain extracted there is a possibility to lock out the AI system 10 as well. Once the system is locked, there is also a mechanism and criteria to unlock the AI system. The AI system 10 may be unlocked only after an unlocking criteria is met. The unlocking criteria may be a certain event, for example, a fixed duration of time, a fixed number of right inputs, a manual override etc.

It must be understood that the AI system as disclosed through the representation shown in FIG. 1 and FIG. 2 are only illustrative and do not limit the scope of the invention from the perspective of the location of the various building blocks of the AI system 10. It is envisaged the position of the building blocks of the AI system can be changed and these are within the scope of this disclosure. The scope of this disclosure is only limited from the perspective of the method steps as disclosed. The implementation of the each of the building blocks of the AI system 10 can be done in any form which may be hardware, software or a combination of hardware and software.

The invention claimed is:

1. A method to prevent capturing of an AI module in an AI system, the method comprising:
   receiving, with at least one processor, an input from at least one user through an input interface operably connected to the at least one processor;
   processing, with the at least one processor, the received input in the AI module;
   flagging the received input by executing a trained model with the at least one processor;
   flagging the at least one user from whom the input was received by executing the trained model with the at least one processor;
   computing, with the at least one processor, information gain extracted by the at least one user based on the processing done in the AI module; and
   locking out, with the at least one processor, the at least one user based on the computed information gain,
   wherein the trained model is trained by:
   receiving input data in a model adapted to be trained;
   labelling the received input data as good data and bad data in the model adapted to be trained;
   classifying binarily the labelled good data and the labelled bad data in the model adapted to be trained;
   inputting the binarily classified data into the AI module; and
   recording internal behavior of the AI module in response to the binarily classified data in the model adapted to be trained.

2. The method as claimed in claim 1, wherein after the recording of the internal behavior of the AI module, the model adapted to be trained is the trained model.

3. The method as claimed in claim 2, wherein the trained model is trained using a supervised learning methodology.

4. The method as claimed in claim 1, wherein during the binary classification of the labelled bad data, the labelled bad data is sampled and represented in a balanced manner with respect to the labelled good data.

5. A method to prevent capturing of an AI module in an AI system, the method comprising:
   receiving, with at least one processor, an input from at least one user through an input interface operably connected to the at least one processor;
   processing, with the at least one processor, the received input in the AI module;
   flagging the received input by executing a trained model with the at least one processor;
   flagging the at least one user from whom the input was received by executing the trained model with the at least one processor;
   computing, with the at least one processor, information gain extracted by the at least one user based on the processing done in the AI module; and
   locking out, with the at least one processor, the at least one user based on the computed information gain.

6. The method as claimed in claim 5, wherein the information gain is computed using information gain methodology.

7. The method as claimed in claim 5, further comprising:
   locking out, with the at least one processor, the at least one user when the information gain extracted exceeds a pre-defined threshold.

8. The method as claimed in claim 5, further comprising:
   locking out, with the at least one processor, the AI system based on the computed information gain extracted by a plurality of users.

9. The method as claimed in claim 8, wherein the locking out the AI system is initiated when a cumulative information gain extracted by the plurality of users exceeds a pre-defined threshold.

* * * * *